United States Patent

Huhndorff et al.

[11] Patent Number: 5,855,627
[45] Date of Patent: Jan. 5, 1999

[54] PROCESS FOR PRODUCING A CURRENT COLLECTOR ASSEMBLY FOR AN ELECTROCHEMICAL CELL

[75] Inventors: Harry R. Huhndorff, Bay Village; John C. Nardi, Brunswick; Edwin T. Russell, Medina, all of Ohio

[73] Assignee: Eveready Battery Company, Inc., St. Louis, Mich.

[21] Appl. No.: 917,146

[22] Filed: Aug. 25, 1997

Related U.S. Application Data

[63] Continuation of Ser. No. 779,415, Jan. 7, 1997, abandoned, which is a continuation of Ser. No. 877,912, May 4, 1992, abandoned.

[51] Int. Cl.$^6$ ............................................ H01M 2/06
[52] U.S. Cl. .................................. 29/623.2; 29/623.4
[58] Field of Search ........................ ; 29/623.4, 623.2; 429/161; H01M 2/06

[56] References Cited

U.S. PATENT DOCUMENTS 1,650,319  11/1927  Briggs .
4,606,983  8/1986  Milewski .

FOREIGN PATENT DOCUMENTS

| 569209 | 11/1993 | European Pat. Off. ......... H01M 2/06 |
| 0028465 | 3/1981 | Japan ...................................... 29/623.2 |
| 57-158947 | 9/1982 | Japan .............................. H01M 2/06 |
| 62-139246 | 6/1987 | Japan .............................. H01M 2/06 |
| 95/05009 | 2/1995 | WIPO .............................. H01M 2/06 |

OTHER PUBLICATIONS

Cross–Sectional Drawing of a Mazda/Wonder LR–20 battery, Mar. '88.

Cross–Sectional Drawing of a RAY–O–VAC 813 battery, Nov. '85.

Primary Examiner—John S. Maples
Attorney, Agent, or Firm—Robert W. Welsh; Michael C. Pophal

[57] ABSTRACT

A current collector assembly for an electrochemical cell is made by inserting an elongated current collector with identically shaped ends, such as a rod, into a seal body such that a minor amount of the current collector passes through the seal body.

12 Claims, 3 Drawing Sheets

PROCESS FOR PRODUCING A CURRENT COLLECTOR ASSEMBLY FOR AN ELECTROCHEMICAL CELL

This is a continuation of application Ser. No. 08/779,415 filed on Jan. 7, 1997, now abandoned, which is a continuation of application Ser. No. 07/877,912 filed on May 4, 1992, now abandoned.

FIELD OF THE INVENTION

This invention relates to a process for producing a current collector assembly for an electrochemical cell and the process used to manufacture the cell containing the assembly.

BACKGROUND OF THE INVENTION

Cylindrical alkaline electrochemical cells generally comprise the following major internal components: anode, cathode, separator, electrolyte, a cylindrical cup shaped metallic container and a current collector assembly. The current collector assembly usually consists of two or more parts that are preassembled to form the current collector assembly which is then inserted into the open end of the container thereby sealing the electrochemically active components within the container. The current collector assembly generally comprises an elastomeric seal body with a centrally located opening and an electrically conductive current collector which is designed to provide electrical continuity from the exterior side of the seal body, through the seal body's opening to the interior of the cell. Although a variety of current collector designs may be used, many battery manufacturers use collectors that are shaped like a nail. This type of collector is generally an elongated rod with a head formed on one end and a point on the other end. The head is formed by flattening the end of the collector thereby increasing the diameter of the rod and creating a ledge or bulge. In conventional battery manufacturing processes, the current collector assembly is manufactured by inserting the pointed end of the collector through the exterior side of the seal body's centrally located opening and forcing the shaft of the collector through the seal body until the head of the collector abuts the exterior surface of the seal body. This process requires that the collector be oriented prior to insertion and that virtually the entire length of the collector pass through the opening in the seal.

A variation of this process which has been used to produce commercially available cells is to weld one end of a rod shaped current collector to the inside surface of a cell's exterior cover and then insert the opposite end of the collector through the seal's central opening until the inside surface of the cover abuts the outside surface of the seal body. This process produces a cell with a rod shaped collector inserted through a seal body.

U.S. Pat. No. 4,606,983 discloses a terminal conductor which incorporates an anchoring means, such as a rounded barb functioning as a buttress, to prevent extraction or explusion of the conductor from the cell. During the cell assembly process, the pointed end of the conductor is inserted into the seal's central opening so that the shank of the collector is forced through the seal body's external opening until the head of the nail abuts the outside surface of the seal.

U.S. Pat. No. 1,650,319 discloses a current collector for batteries which contain manganese dioxide within a cup shaped zinc container. The centrally located current collector has a constant diameter throughout most of its length. However, at one end, a short section of the collector has a reduced diameter and that portion of the collector is inserted through the opening in the sealing disc until the shoulder of the collector abuts the interior surface of the sealing disc.

The prior art processes for manufacturing current collector assemblies have the following disadvantages. First, the collectors must be oriented prior to insertion of the collector through the seal. Second, one of the long standing problems with this type of process is the sensitivity of the collector assembly process to misalignment of the collector during insertion which may allow the leading end of the collector to nick or scratch the interior surface of the seal's opening. Third, small imperfections on the surface of the collector's shaft can create longitudinal grooves in the seal body as the collector is inserted through the seal's opening. The resulting nicks, scratches or grooves in the seal may enable the cell's electrolyte to migrate via the groove from inside the cell to outside the cell. In order to prevent leakage of electrolyte from the cell along the surface of the nail's shaft, battery manufacturers that use a nail shaped current collector have been forced to spend substantial amounts of money to develop and monitor current collector manufacturing processes that do not mar the surface of the collector prior to inserting the collector through the seal. In addition, battery manufacturers must insure that the collector assembly manufacturing processes maintain virtually perfect alignment between the nail and seal during insertion of the collector through the seal body in order to avoid the possibility of damaging the inner surface of the seal body's central opening. Fourth, collector shapes are generally limited to those shapes which can be easily inserted through a seal body. Conventionally, collectors with constant diameters are preferred. Nonsymmetrically shaped collectors, such as those which are curvilinear or have been flattened in order to increase the collector's surface area, have not been used because the nonsymmetrically shaped portion of the collector could not be forced through the opening in the seal body. Yet another problem with the known manufacturing processes is the time required to fabricate a current collector assembly. In high speed manufacturing processes, there is a need to reduce assembly time in order to minimize manufacturing costs. However, the known current collector assembly processes actually waste time when the longest portion of the collector is forced through the seal even though only a small portion of the collector needs to be inserted through the seal. While the manufacturing processes currently in use have been successful in producing large quantities of current collector assemblies, there is a need to develop a current collector assembly process that: (1) simplifies the manufacturing process by eliminating the need to orient a collector prior to insertion, (2) allows irregularly shaped collectors to be assembled into current collector assemblies, (3) decreases manufacturing costs by inserting a minimum length of the collector through the seal body thereby minimizing the time required to fabricate the current collector assembly, and (4) reduces the risk of leakage by minimizing the opportunity for damaging the inner surface of the seal's opening during the collector insertion process.

SUMMARY OF THE INVENTION

The present invention is a process for manufacturing a current collector assembly comprising a seal body and an elongated current collector having two identically shaped ends. The seal body has a top surface, a bottom surface and an opening connecting the top surface to the bottom surface. The assembly is manufactured by inserting one of the collector's ends through the opening from the bottom surface of the seal body for a distance sufficient to expose a minor portion of the collector to the area above the top surface of the seal body.

In another aspect, this invention is a process for manufacturing an electrochemical cell comprising the steps of fabricating a subassembly, fabricating a current collector assembly, inserting the current collector assembly into the subassembly and then sealing the interface between the subassembly and the current collector assembly. The subassembly is fabricated by inserting a first electrochemically active material, an electrically nonconductive separator, a second electrochemically active material and electrolyte into an electrically conductive container that is open on one end and closed on the other end. The separator physically and electrically isolates the first electrochemically active material from the second electrochemically active material while allowing for ionic conductivity therebetween. The first electrochemically active material contacts the container, while the second electrochemically active material is electrically isolated from the container. Electrolyte simultaneously contacts the first and second electrochemically active materials and the separator. The current collector assembly comprises a disk shaped and electrically nonconductive seal body and a current collector having two identically shaped ends. The seal body has a top surface, a bottom surface and an opening connecting the top surface to the bottom surface. The current collector assembly is fabricated by inserting one end of the collector through the opening from the seal body's bottom surface for a distance sufficient to simultaneously expose a minor portion of the collector to the area above the seal body's top surface and a major portion of the collector to the area below the seal body's bottom surface. The current collector assembly is then inserted into the open end of the subassembly's container such that the current collector assembly closes the open end of the subassembly's container and the major portion of the collector extending from the seal body's bottom surface contacts the second electrochemically active material. The interface between the open end of the subassembly's container and the current collector's seal body is then sealed.

The process of this invention enables a manufacturer to efficiently assemble current collector assemblies by eliminating the need to orient a collector and reducing assembly time by inserting a minimum length of collector through the seal body. The insertion of a short length of collector through the seal reduces the risk of leakage by minimizing the opportunity for damaging the inner surface of the seal's opening. In addition, either symmetrically shaped or non-symmetrically shaped collectors can be incorporated into current collector assemblies.

DETAILED DESCRIPTION OF THE INVENTION

Figure 1:
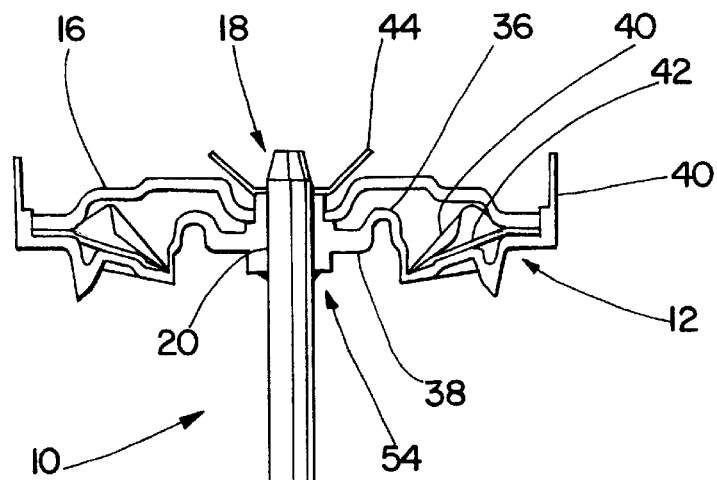
FIG. 1 is a cross sectional view of a current collector assembly made by a process of this invention.

Referring now to the drawings, and more particularly to FIG. 1, there is shown a current collector assembly, generally designated 10, made by a process of this invention. The current collector assembly 10 includes a seal body 12, and a rod shaped current collector 14. The seal body is generally shaped like a disk and made from electrically nonconductive material. This component has a top surface 36, a bottom surface 38 and an upstanding wall 40 which defines the circumferential boundary of the seal body. Either one or both of these surfaces may be contoured. An opening 20, located near the central region of the seal body, connects the top surface 36 to the bottom surface 38. Suitable materials from which the seal body may be manufactured include plastics, such as: nylon, polypropylene, filled polypropylene, and polysulfone. The preferred material is nylon.

The current collector 14 is an elongated electrical conductor with two identically shaped ends. Preferably, the collector is symmetrically shaped. Most preferably, the collector is shaped like a rod. The sealing surface of the collector is preferably free of imperfections such as burrs, nicks and scratches. The use of collectors that are not symmetrical about the middle portion of the collector is acceptable provided the two ends of the collector are identically shaped. The middle portion of the collector may be made in a curvilinear fashion, flattened in order to increase the collector's surface area and/or modified by altering the surface finish. Preferably, the collectors are made from wire that is cut to the required length. The diameter of each collector is essentially constant throughout its length. However, each end may be slightly chamfered in order to remove small burrs and provide a lead-in to the seal. The materials from which the collector may be made include: brass, zinc, zinc alloys, nickel plated steel, tin plated steel and other electrially conductive materials that are stable in the cell's caustic environment.

In the collector assembly process, one end of the collector, hereinafter known as the leading end 18 of collector 14, is forced through the seal body's central opening 20 by inserting the collector into the opening from the seal body's bottom surface 38 and pushing the leading end 18 of the collector through the seal body for a distance sufficient to expose a minor portion of the collector's leading end 18 to the area above the seal body's top surface 36. The top surface 36 of seal body 12 is defined to be that surface which will face away from the interior of the cell and the bottom surface 38 of seal body 12 will face toward the cell's interior when the collector assembly is assembled into a cell. The major portion of the collector extends from the seal body's bottom surface. The exact distance which the leading end of the collector 18 extends through the seal body is not critical provided the collector is forced through the seal body a distance sufficient to establish electrical continuity between the area above the top surface of the seal body and the area below the bottom surface of the seal body. Preferably, the collector is inserted less than one-half of its length through the seal body. Most preferably, the collector is inserted less than one-quarter of its length through the seal body.

In order to insure a leakproof seal between the collector and the seal body's central opening, the outside diameter of the collector and the inside diameter of the seal body's central opening are selected so as to create an interference fit. Optionally, a sealant 54 may be applied to the collector's circumferential surface near the leading end 18 of collector 14 prior to forcing that portion of the collector through the seal. Alternatively, the sealant may be applied to the inner surface of the seal body's opening. The action of inserting collector 14 into the seal's opening 20 results in the smearing of a thin film of sealant along the interface between the collector and seal body. If a slight excess of sealant is used, a circular bead of the sealant will be formed at the junction of the current collector and the inside surface 38 of the seal body 12 which defines central opening 20. Suitable sealant materials include asphalt, polyamides and polyacrylics.

The inner cover 16, shown in FIG. 1, is located adjacent the top surface 36 of seal body 12 and is an optional component of the current collector assembly. The inner cover is usually placed on the seal body prior to inserting the collector through the central opening. An example of a suitable inner cover is described in U.S. Pat. No. 5,051,323 which is herein incorporated by reference.

Yet another optional component of a current collector assembly is a locking connector 44 which serves as a retaining means when it is secured to that portion of the collector which extends above the top surface of the seal body. Suitable examples of retaining means include locking connectors known by the tradename Tinnernan fasteners and sold by Eaton Corporation of Cleveland, Ohio. These fasteners are designed to allow a portion of the rod shaped collector to be easily inserted through the fastener from one direction while preventing retraction of the collector in the opposite direction. The fastener may serve the purpose of limiting movement of the collector toward the seal and/or it could serve as an electrical connection between the collector and the battery's external cover which will be described later. The connector may be secured to the collector via welding, friction fit, an electrically conductive adhesive or other suitable means known in the art.

If desired, a venting mechanism may be incorporated into the collector assembly. As described in U.S. Pat. No. 3,314,824, which is herein incorporated by reference, the toothed washer piercing tool 41 and the dished shaped washer 42 shown in FIG. 1 cooperate to pierce the seal body if the cell's internal pressure exceeds a predetermined pressure.

Figure 2:
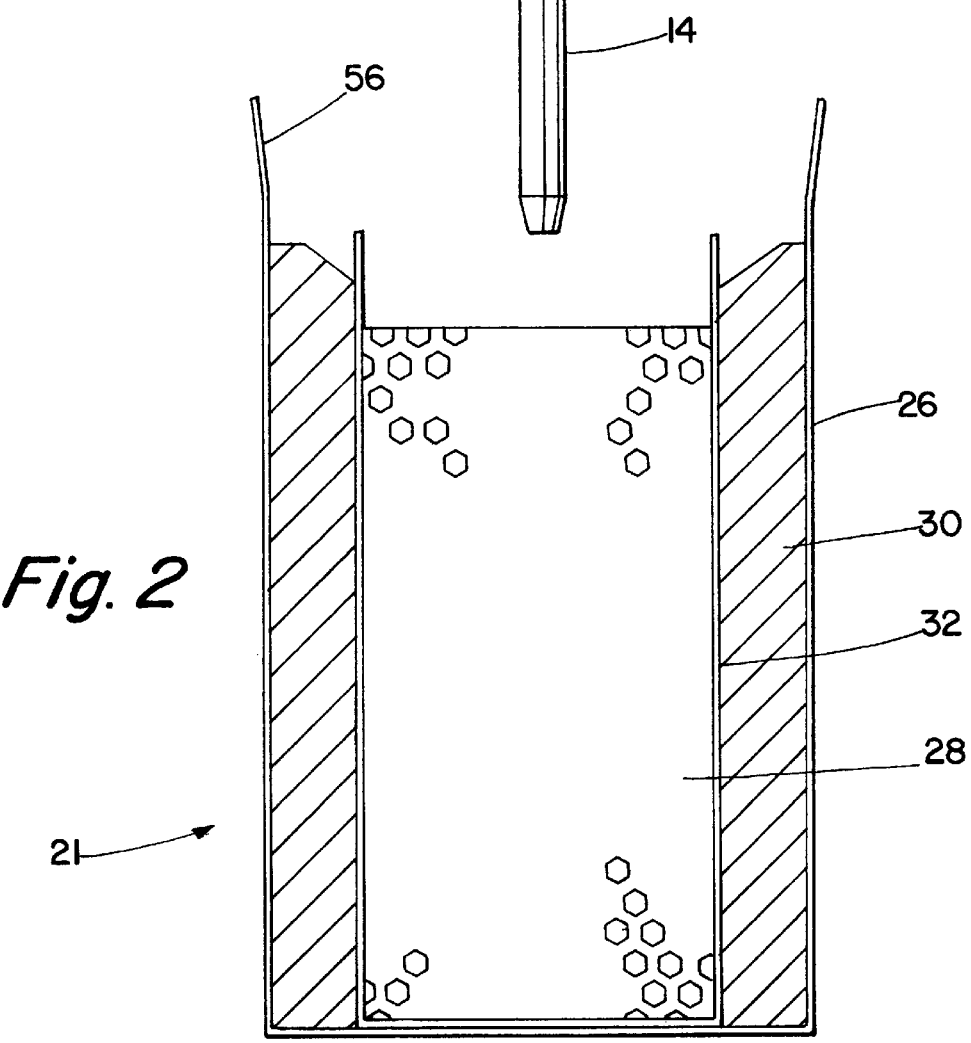
FIG. 2 is a cross sectional view of a subassembly which forms a part of a cell made by a process of this invention.
Figure 3:
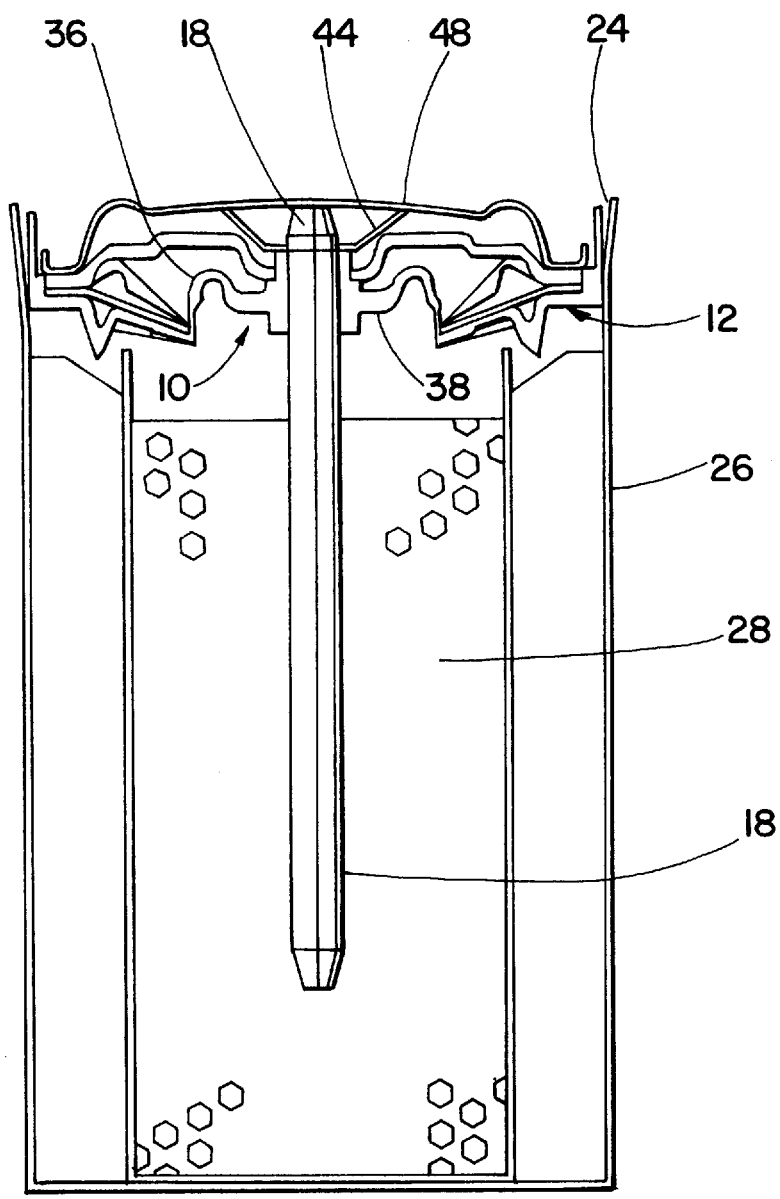
FIG. 3 is a cross sectional view of a partially assembled cell.

FIG. 2 shows a subassembly, generally designated 21, into which the current collector assembly shown in FIG. 1 is inserted in order to manufacture the partially assembled battery shown in FIG. 3. Referring to FIG. 2, the subassembly is fabricated by inserting a first elecrochemically active material 30 into the open end of container 26. Conventionally, this material comprises manganese dioxide and an electrically conductive powder such as graphite. The mixture is mechanically molded to pack the electrochemically active material against the container's sidewalls thereby forming a cylindrical hollow along the container's central axis. The inner surface of the formed electrode is lined with a separator 32 to create a physical barrier that will allow ionic conductivity to take place. Suitable materials from which the separator may be made include cellulose, nylon, rayon and polyvinyl alcohol. A second electrochemically active material 28, comprising powdered zinc, is injected into the hollow space defined by the separator 32. The second electrochemically active material 28 may contain additional ingredients, including a binder or corrosion inhibitors. A quantity of a suitable electrolyte, such as an aqueous solution of potassium hydroxide or sodium hydroxide, is dispensed into the open end of the cell. A tacky substance 56, such as asphalt, may be applied to the inner top surface of container 26 to serve as a barrier to creepage of the cell's electrolyte along the container's surface.

Shown in FIG. 3 is a partially assembled cell including a current collector assembly 10 inserted into the open end 24 of the subassembly's container 26. The current collector assembly's seal body 12 closes the open end of container 26. A portion of the collector that extends from the bottom surface 38 of seal body 12 is inserted into the powdered zinc mixture 28 located within the subassembly thereby establishing electrical continuity between the zinc and the portion of the collector which is exposed to the area above the seal body's top surface. A locking means, such as a Tinnerman fastener 44, may be force fitted onto the leading end of the collector which extends above the top surface 36 of the seal body 12. This fastener 44 prevents inward movement of the collector 14 through the seal body 12 even if the cell is dropped such that the leading end 18 of collector 14 is pushed toward seal 12. A first external cover 48 may be welded to the exposed end of the current collector thereby forming the cell's negative terminal.

Figure 4:
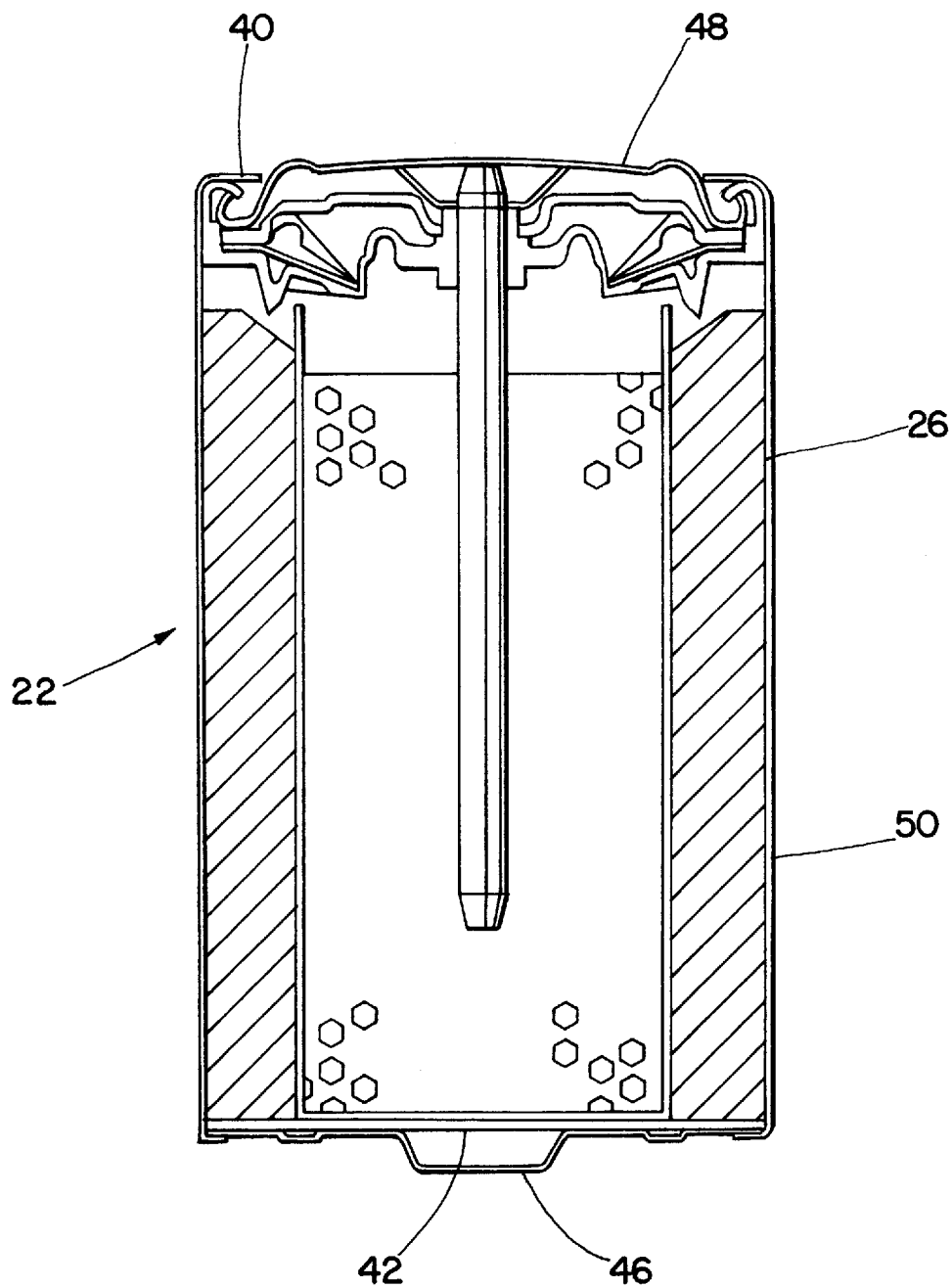
FIG. 4 is a cross sectional view of a completely assembled battery.

As shown in FIG. 4, the rim 27 of container 26 is bent inwardly toward the seal body to form a hermetic seal. The resulting electrochemical cell, generally designated 22, is capable of generating an electric current when an electrically conductive path is established between the container and the portion of the collector exposed to the area above the seal body's top surface. U.S. Pat. No. 3,069,489, which is incorporated by reference, describes the use of radial compression to seal the interface between the seal body 12 and the container 26. The battery may be finished by welding a second external cover 46 to the closed end 47 of container 26 thereby forming the battery's positive terminal. A label 50 may then be secured to the cell's circumferential surface.

It is thought that the methods of assembling the current collector assembly and the electrochemical cell containing the same will be understood from the foregoing description. Further, various changes in the form, construction and selection of materials may be made without departing from the spirit and scope of the invention as the form and materials described herein are merely preferred embodiments.

We claim:

1. A process for assembling an electrochemical cell, comprising the steps of:
   a) fabricating a subassembly for an electrochemical cell by inserting a first electrochemically active material, an electrically nonconductive separator, a second electrochemically active material and an electrolyte into an electrically conductive container that is open on one end and closed on the other end, said separator physically isolating said first electrochemically active material from said second electrochemically active material while allowing for ionic conductivity therebetween, said first electrochemically active material contacting the container, said second electrochemically active material is electrically isolated from the container; said electrolyte simultaneously contacting said first and second electrochemically active materials and said separator;
   b) fabricating a current collector assembly comprising a disk shaped and electrically nonconductive seal body and an elongated current collector having two identically shaped ends, said seal body having a top surface, a bottom surface and an opening connecting the top surface to the bottom surface, wherein the improvement comprises applying sealant to the surface of the current collector near one end thereof inserting said one end of the collector through the opening from the seal body's bottom surface for a distance sufficient to simultaneously expose a minor portion of the collector to the area above the seal body's top surface and a major portion of the collector to the area below the seal body's bottom surface the amount of applied sealant being sufficient for simultaneously creating an annular bead of sealant at the junction of the current collector and the seal body bottom surface and also smearing a thin film of sealant along the interface between the current collector and the seal body;

c) inserting said current collector assembly into the open end of the subassembly's container, said current collector assembly closing the open end of the subassembly's container and the end of the collector extending from the seal body's bottom surface contacting the second electrochemically active material; and d) sealing the interface between the open end of the subassembly's container and the current collector's seal body.

2. The process of claim 1, wherein the collector is inserted less than one-half of its length through the opening in the seal body.

3. The process of claim 1, wherein the collector is symmetrically shaped.

4. The process of claim 3, wherein the collector is shaped like a rod.

5. The process of claim 1, further comprising: securing a retaining means to the end of the collector exposed to the area above the top surface of the seal body.

6. The process of claim 5, wherein the retaining means is welded to the collector.

7. The process of claim 5, wherein the retaining means is friction fitted onto the collector.

8. The process of claim 1, further comprising: placing an external cover above the seal body and in contact with the end portion of the collector exposed to the area above the seal body's top surface.

9. The process of claim 8, wherein the exposed portion of the collector is welded to the external cover.

10. The process of claim 1 wherein the sealant in step b) is selected from the group consisting of asphalt polyamides and polyacrylics.

11. The process of claim 1, wherein step (b) includes adding a sealant to the opening in the seal body prior to inserting the collector through the opening in the seal body's bottom surface.

12. The process of claim 1, wherein step (b) includes adding an inner cover to the top surface of said seal body.

* * * * *